(12) United States Patent
Oohashi

(10) Patent No.: US 7,579,740 B2
(45) Date of Patent: Aug. 25, 2009

(54) AUTOMOTIVE ALTERNATOR VOLTAGE CONTROL APPARATUS

(75) Inventor: Atsushi Oohashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 223 days.

(21) Appl. No.: 10/580,309

(22) PCT Filed: Nov. 4, 2004

(86) PCT No.: PCT/JP2004/016313

§ 371 (c)(1), (2), (4) Date: May 25, 2006

(87) PCT Pub. No.: WO2006/048930

PCT Pub. Date: May 11, 2006

(65) Prior Publication Data

US 2007/0102931 A1 May 10, 2007

(51) Int. Cl.
*H02K 13/00* (2006.01)

(52) U.S. Cl. .............. 310/239; 310/68 D; 310/68 C

(58) Field of Classification Search ............ 310/68 D, 310/239, 68 R, 71, 68 C, 64
See application file for complete search history.

(56) References Cited

U.S. PATENT DOCUMENTS

| | | | | |
|---|---|---|---|---|
| 3,538,361 A | * | 11/1970 | Haut et al. ............. | 310/68 R |
| 3,553,504 A | * | 1/1971 | Balcke et al. .......... | 310/68 D |
| 5,550,415 A | * | 8/1996 | Adachi et al. .......... | 310/68 R |
| 5,686,780 A | * | 11/1997 | Adachi et al. .......... | 310/68 D |
| 5,907,203 A | * | 5/1999 | Chen et al. ............. | 310/65 |
| 6,081,054 A | * | 6/2000 | Kashihara et al. ...... | 310/68 D |
| 6,236,557 B1 | * | 5/2001 | Kashihara et al. ...... | 361/301.3 |
| 6,291,913 B1 | * | 9/2001 | Nikawa et al. ......... | 310/68 R |
| 6,304,012 B1 | * | 10/2001 | Chen et al. ............. | 310/58 |
| 6,538,352 B2 | * | 3/2003 | Asao ..................... | 310/68 D |
| 2002/0050750 A1 | * | 5/2002 | Oohashi et al. ........ | 310/68 D |
| 2003/0030964 A1 | * | 2/2003 | Oohashi et al. ........ | 361/306.1 |
| 2003/0107292 A1 | * | 6/2003 | Kashihara et al. ...... | 310/239 |

FOREIGN PATENT DOCUMENTS

| | | | |
|---|---|---|---|
| EP | 669696 A1 | * | 8/1995 |
| JP | 57-116569 A | | 7/1982 |
| JP | 11-164518 A | | 6/1999 |
| JP | 2001-16829 A | | 1/2001 |
| JP | 2002-58172 A | | 2/2002 |

OTHER PUBLICATIONS

Microfilm of the specification and drawings annexed to the request of Japanese Utility Model Application No. 139724/1988 (Laid-Open No. 60466/1990), (Mitsuba Electric Mfg. Co., Ltd.), May 2, 1990, corresponding to Japanese Utility Model Examined Publication No. 6-46216.

\* cited by examiner

*Primary Examiner*—Quyen Leung
*Assistant Examiner*—Alex W Mok
(74) *Attorney, Agent, or Firm*—Sughrue Mion, PLLC

(57) ABSTRACT

An object of the present invention is to provide a voltage control apparatus enabling reduction in an angle formed by first and second circumferential end surfaces of a general fan shape centered around a slinger. In the present invention, a slinger, a brush holder, and a connector are constituted by a resin body that is formed integrally using an insulating resin, and a voltage regulator, a surge absorber, and the connector are disposed radially outside the slinger alongside the brush holder on a first circumferential side of the brush holder.

12 Claims, 6 Drawing Sheets

AUTOMOTIVE ALTERNATOR VOLTAGE CONTROL APPARATUS

TECHNICAL FIELD

The present invention relates to an automotive alternator voltage control apparatus that performs output voltage control in an automotive alternator that is mounted to a passenger car or a truck, etc.

BACKGROUND ART

In conventional automotive alternator voltage control apparatuses, a brush holder is disposed so as to extend radially outward from an outer peripheral wall surface of a slinger, brushes are housed inside the brush holder, a voltage regulator is disposed on a first side of the brush holder in an axial direction of the slinger so as to overlap with the brush holder, a connector is disposed so as to extend radially outward from an outer peripheral wall surface of the slinger on a first circumferential side of the brush holder, a surge absorber is disposed on a first side of the connector in the axial direction of the slinger so as to overlap with the connector, and the automotive alternator voltage control apparatus is formed so as to have a general fan shape when viewed from an axial direction of a slinger (see Patent Literature 1, for example).

Patent Literature 1
   Japanese Patent Laid-Open No. 2001-16829 (Gazette)

DISCLOSURE OF THE INVENTION

Problem to be Solved by the Invention

In conventional automotive alternators, a rectifier and the voltage control apparatus, which are formed so as to have a general C shape when viewed from the axial direction of the slinger, are disposed together in a plane perpendicular to the axial direction of the slinger. Because the voltage regulator, which has a wider circumferential width than the brush holder, is disposed on a first side of the brush holder in an axial direction of the slinger so as to overlap with the brush holder, one problem has been that the voltage regulator projects beyond the brush holder on first and second circumferential sides, increasing the angle formed by first and second circumferential end surfaces of the general fan shape of the voltage control apparatus.

Thus, because a region occupied by the rectifier in the plane perpendicular to the axial direction of the slinger is constricted, reducing area for a heat sink on the rectifier, problems have arisen such as cooling efficiency by the heat sink decreasing, making it impossible to suppress temperature increases in diodes of the rectifier.

The present invention aims to solve the above problems and an object of the present invention is to provide an automotive alternator voltage control apparatus enabling an angle formed by first and second circumferential end surfaces of a general fan shape centered around a slinger to be reduced by adapting a layout of a brush holder, a voltage regulator, a surge absorber, and a connector.

Means for Solving the Problem

In order to achieve the above object, according to one aspect of the present invention, there is provided an automotive alternator voltage control apparatus including: an annular slinger; a brush holder that is disposed so as to extend radially from an outer peripheral wall surface of the slinger and that is formed such that a brush insertion aperture is open at an inner peripheral wall surface of the slinger; positive electrode and negative electrode brushes that are inserted into the brush insertion aperture so as to line up in an axial direction of the slinger and be movable in a radial direction of the slinger; a voltage regulator having an integrated circuit (IC) on which a circuit is formed that controls an automotive alternator output voltage; a surge absorber that absorbs surges arising due to output voltage control by the voltage regulator; and a connector for input and output from and to an external device, wherein: the slinger, the brush holder, and the connector are constituted by a resin body that is formed integrally using an insulating resin; and the voltage regulator, the surge absorber, and the connector are disposed radially outside the slinger alongside the brush holder on a first circumferential side of the brush holder.

EFFECTS OF THE INVENTION

According to the present invention, because the voltage regulator, the surge absorber, and the connector are disposed radially outside the slinger alongside the brush holder on a first circumferential side of the brush holder, an angle formed by first and second circumferential end surfaces of a general fan shape centered around the slinger is reduced. Thus, if this voltage control apparatus is mounted to an automotive alternator, a region occupied by the rectifier in a plane perpendicular to an axial direction of the slinger is widened, enabling area of a heat sink of the rectifier to be increased. Cooling efficiency by the heat sink is thereby increased, enabling temperature increases in diodes of the rectifier to be suppressed.

BEST MODE FOR CARRYING OUT THE INVENTION

The present invention provides a voltage control apparatus enabling circumferential size of a general fan shape centered around a slinger to be minimized by adapting a layout of a brush holder, a voltage regulator, a surge absorber, and a connector constituting the voltage control apparatus. In automotive alternators mounted with this voltage control apparatus, increases in installation space for a rectifier can be achieved, improving cooling of the rectifier.

An automotive alternator voltage control apparatus to which the present invention has been applied will now be explained in detail with reference to the drawings.

Embodiment 1

Figure 1:
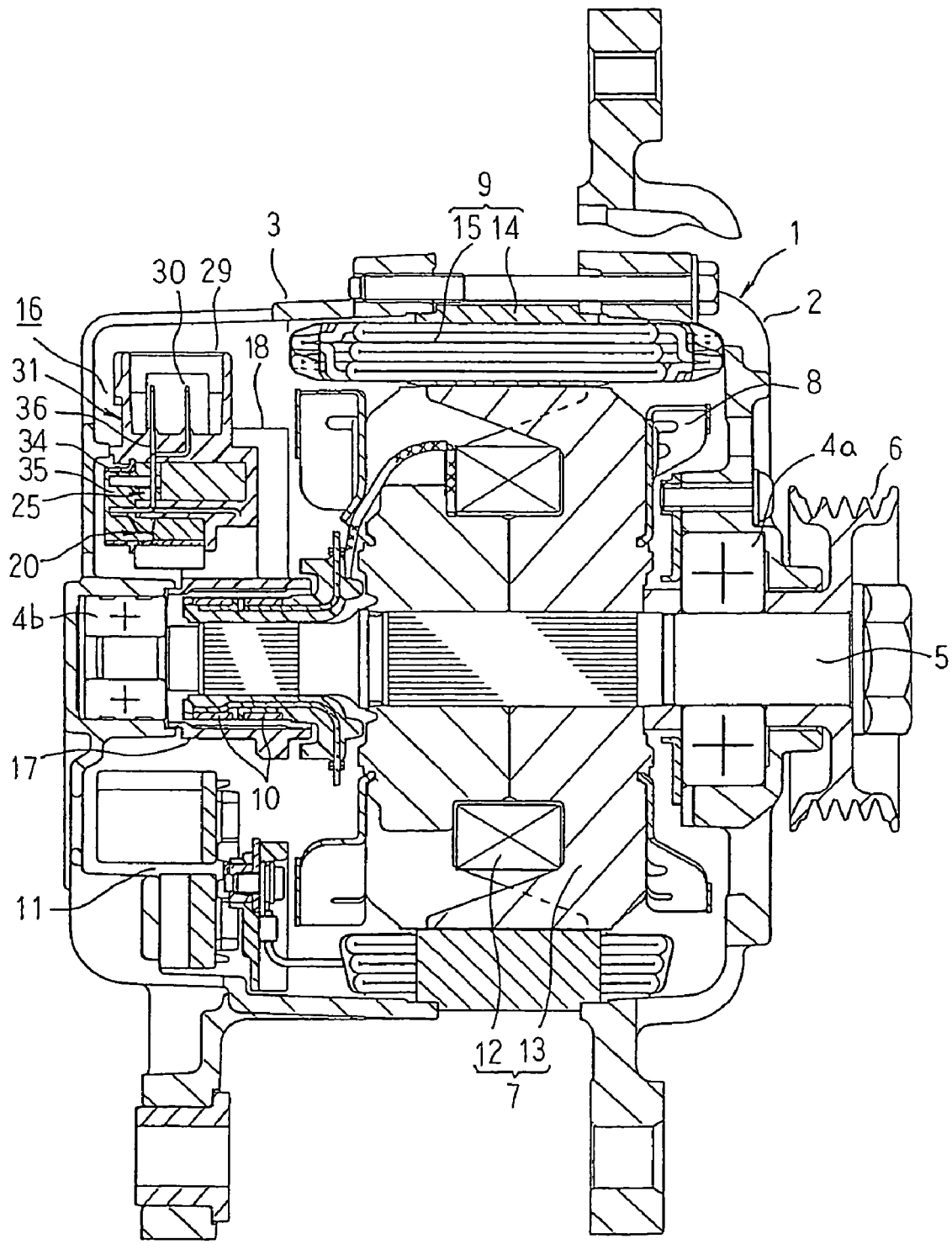
FIG. 1 is a longitudinal section showing an automotive alternator mounted with a voltage control apparatus according to Embodiment 1 of the present invention (Embodiment 1)
Figure 2:
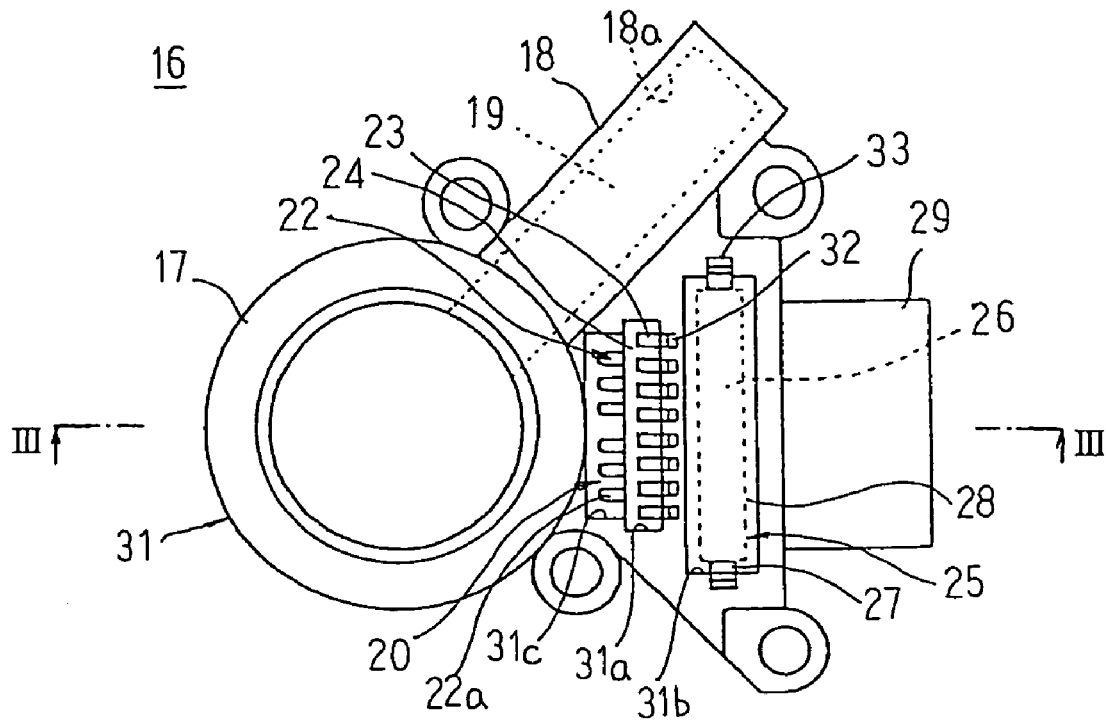
FIG. 2 is a plan explaining a configuration of the automotive alternator voltage control apparatus according to Embodiment 1 of the present invention (Embodiment 1)
Figure 3:
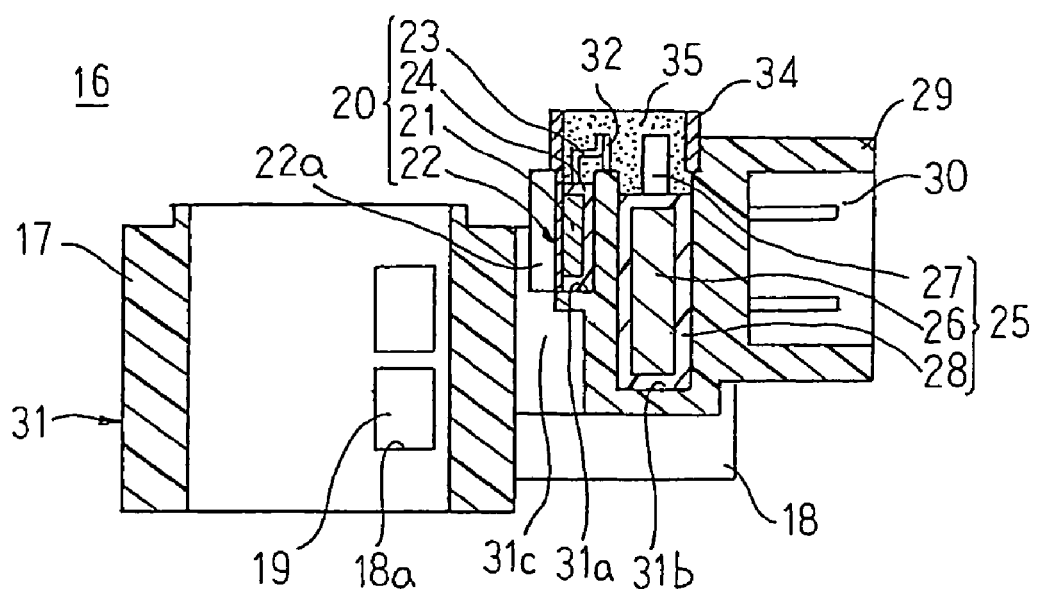
FIG. 3 is a cross section taken along line III-III in FIG. 2 viewed from the direction of the arrows (Embodiment 1)
Figure 4:
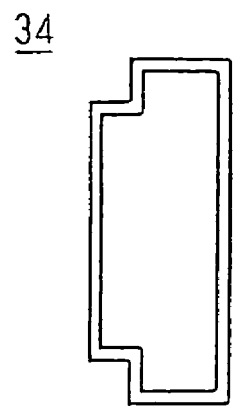
FIG. 4 is a plan showing a resin tub used in the automotive alternator voltage control apparatus according to Embodiment 1 of the present invention (Embodiment 1)

FIG. 1 is a longitudinal section showing an automotive alternator mounted with a voltage control apparatus according to Embodiment 1 of the present invention, FIG. 2 is a plan explaining a configuration of the automotive alternator voltage control apparatus according to Embodiment 1 of the present invention, FIG. 3 is a cross section taken along line III-III in FIG. 2 viewed from the direction of the arrows, and FIG. 4 is a plan showing a resin tub used in the automotive alternator voltage control apparatus according to Embodiment 1 of the present invention. Moreover, FIG. 2 shows the voltage control apparatus before mounting of the resin tub.

In FIG. 1, an automotive alternator includes: a case 1 constituted by a front bracket 2 and a rear bracket 3 that are each generally cup-shaped and made of aluminum; a shaft 5 rotatably supported in the case 1 by means of first and second bearings 4a and 4b; a pulley 6 affixed to a first end of the shaft 5 that projects outward at a front end of the case 1; a rotor 7 affixed to the shaft 5 and rotatably disposed inside the case 1; fans 8 fixed to first and second axial end surfaces of the rotor 7; a stator 9 held by an inner wall surface of the case 1 so as to surround the rotor 7; and a pair of slip rings 10 fixed to a second end portion of the shaft 5 so as to supply electric current to the rotor 7. In addition, the automotive alternator includes: a rectifier 11 that is electrically connected to the stator 9 so as to convert alternating current originating in the stator 9 into direct current; and a voltage control apparatus 16.

The rotor 7 includes: a rotor coil 12 that generates magnetic flux on passage of electric current; and a pole core 13 that is disposed so as to cover the rotor coil 12 such that magnetic poles are formed by the magnetic flux from the rotor coil 12. The stator 9 includes: a stator core 14; a stator coil 15 that is installed in the stator core 14 such that an alternating current arises due to changes in the magnetic flux from the rotor coil 12 accompanying rotation of the rotor 7.

Next, configuration of the voltage control apparatus 16 will be explained with reference to FIGS. 2 through 4.

The voltage control apparatus 16 includes: a ring-shaped slinger 17 through which the shaft 5 is inserted; a brush holder 18 that is disposed so as to extend radially from an outer peripheral wall surface of the slinger 17 and that is formed such that a brush insertion aperture 18a having an aperture direction in a radial direction is open at an inner peripheral wall surface of the slinger 17; positive electrode and the negative electrode brushes 19 that are disposed inside the brush insertion aperture 18a of the brush holder 18 so as to line up in an axial direction of the slinger 17 and be movable radially; a voltage regulator 20 that is disposed radially outside the slinger 17 on a first circumferential side of the brush holder 18 and adjusts a magnitude of the alternating voltage originating in the stator 9; a surge absorber 25 that is disposed radially outside the voltage regulator 20 so as to absorb surges arising due to voltage adjustment by the voltage regulator 20 and prevent propagation of noise to vehicle electrical load devices such as audio equipment, etc.; and a connector 29 that is disposed radially outside the surge absorber 25 so as to input from outside the field current that is supplied to the rotor coil 12 through the brushes 19 and the slip rings 10 and externally output the direct current that has been rectified by the rectifier 11.

The voltage regulator 20 includes: an integrated circuit (IC) chip 21 on which is formed a circuit required for output voltage control of the automotive alternator; a heat sink 22 made of aluminum, for example, having a major surface to which the IC chip 21 is bonded; external connecting terminals 23 that are electrically connected to electrode pads (not shown) of the IC chip 21; and a resin portion 24 in which the IC chip 21 is molded in an insulating resin such that portions of the external connecting terminals 23 are exposed. Here, the IC chip 21 is sealed in a resin so as to be configured into a molded IC. This molded IC is formed so as to have a flat external shape, and all of the external connecting terminals 23 project outward parallel to the major surface of the heat sink 22 from a single side surface of the resin portion 24.

The surge absorber 25 includes: a capacitor element 26 having a pair of terminals 27; and a resin portion 28 in which the capacitor element 26 is sealed in an epoxy resin, for example, such that portions of the terminals 27 are exposed. This surge absorber 25 is formed so as to have a flat external shape, and the pair of terminals 27 project outward from a single side surface of the resin portion 28 so as to be side by side.

The slinger 17, the brush holder 18, and the connector 29 are molded integrally using an insulating resin such as a polyphenylene sulfide (PPS) resin, etc., for example, so as to be configured into a generally fan-shaped resin body 31 centered around the slinger 17.

In the resin body 31, an IC housing aperture 31a having a rectangular cross section functioning as a voltage regulator housing aperture and a capacitor housing aperture 31b having a rectangular cross section functioning as a surge absorber housing aperture are formed between the slinger 17 and the connector 29 so as to have short-side directions of the rectangular cross sections aligned radially, so as to be open at a first axial end of the slinger 17 (in this case, a rear end), and so as to line up radially. In addition, a penetrating aperture 31c is formed so as to pass through the resin body 31 in an axial direction of the slinger 17 between the slinger 17 and the IC housing aperture 31a.

A terminal assembly (not shown) constituted by insert conductors 36 is insert molded into the resin body 31. Portions of four insert conductors 36 project into the connector 29 so as to constitute input and output terminals 30 that can be electrically connected to an external device (not shown). Portions of eight insert conductors 36 are exposed in a vicinity of an opening of the IC housing aperture 31a of the resin body 31 so as to constitute voltage regulator connecting terminals 32. In addition, portions of two insert conductors 36 are exposed in a vicinity of an opening of the capacitor housing aperture 31b of the resin body 31 so as to constitute surge absorber connecting terminals 33.

The molded IC that is formed by molding the IC chip 21 in the resin is housed inside the IC housing aperture 31a such that the external connecting terminals 23 projects outward.

These external connecting terminals 23 are joined by welding, etc., to the voltage regulator connecting terminals 32 that are exposed in the vicinity of the opening of the IC housing aperture 31a. Here, radiating fins 22a of the heat sink 22 project inside the penetrating aperture 31c.

The surge absorber 25 is housed inside the capacitor housing aperture 31b such that the terminals 27 project outward. These terminals 27 are joined by welding, etc., to the surge absorber connecting terminals 33 exposed in the vicinity of the opening of the capacitor housing aperture 31b.

In addition, a resin tub 34 that is formed into a frame shape that surrounds the IC housing aperture 31a and the capacitor housing aperture 31b is disposed on the resin body 31 so as to surround the IC housing aperture 31a and the capacitor housing aperture 31b, and the resin tub 34 is filled with a silicone resin 35. Thus, the resin portions 24 and 28, the external connecting terminals 23, the terminals 27, the voltage regulator connecting terminals 32, the surge absorber connecting terminals 33, and terminal joint portions are embedded inside the silicone resin 35.

A voltage control apparatus 16 configured in this manner is mounted by inserting the second end portion of the shaft 5 through the slinger 17 and fastening the resin body 31 to the rear bracket 3. The voltage control apparatus 16 is thereby disposed in a general fan shape centered around the slinger 17 in a plane perpendicular to a central axis of the shaft 5. The brushes 19 are pressed onto the slip rings 10 by forces from springs (not shown) that are disposed in a compressed state inside the brush insertion apertures 18a of the brush holder 18, and slide in contact with the outer peripheral surfaces of the slip rings 10 with the rotation of the shaft 5, ensuring electrical connection.

The rectifier 11 is formed so as to have a planar shape that is a general C shape when viewed from an axial direction of the shaft 5, and is disposed in a region where the voltage control apparatus 16 is not installed (a C-shaped region) in a plane perpendicular to the central axis of the shaft 5.

In Embodiment 1, the voltage control apparatus 16 is configured such that the brush holder 18 is disposed so as to extend radially from the outer peripheral wall surface of the slinger 17, and the voltage regulator 20, the surge absorber 25, and the connector 29 are disposed radially outside the slinger 17 so as to line up in a single column in a radial direction on a first circumferential side of the brush holder 18. Thus, the angle formed by first and second circumferential end surfaces of the general fan shape centered around the slinger 17 is narrower, enabling a compact voltage control apparatus 16 having a small circumferential size to be achieved. Thus, when this voltage control apparatus 16 is mounted to an automotive alternator, because the region occupied by the rectifier 11 in the plane perpendicular to the axial direction of the slinger 17 can be widened, enabling the area of the heat sink of the rectifier 11 to be increased, cooling efficiency of the heat sink is improved, enabling temperature increases in the diodes of the rectifier 11 to be suppressed.

Because the IC housing aperture 31a and the capacitor housing aperture 31b that house the voltage regulator 20 and the surge absorber 25 are formed so as to have rectangular cross sections that have short sides aligned radially, the voltage regulator 20 and the surge absorber 25, which have flat external shapes, can be arranged in a single column so as to have short sides aligned radially. Thus, radial length of the voltage regulator 20, the surge absorber 25, and the connector 29 arranged in a single column is shorter, and the connector 29 will not project beyond the rear bracket 3.

Because the IC housing aperture 31a and the capacitor housing aperture 31b are formed in the resin body 31 so as to be open at the first axial end of the slinger 17, the voltage regulator 20 and the surge absorber 25 can be inserted into the IC housing aperture 31a and the capacitor housing aperture 31b from the first axial end of the slinger 17, improving workability when inserting the voltage regulator 20 and the surge absorber 25. Because the connection portions between the external connecting terminals 23 of the voltage regulator 20 and the voltage regulator connecting terminals 32 and the connection portions between the terminals 27 of the surge absorber 25 and the surge absorber connecting terminals 33 are configured at the first axial end of the slinger 17, workability when joining the terminals to each other is improved. In addition, because the connection portions between the external connecting terminals 23 of the voltage regulator 20 and the voltage regulator connecting terminals 32 and the connection portions between the terminals 27 of the surge absorber 25 and the surge absorber connecting terminals 33 are embedded in the silicone resin 35, insulation and water proofing are improved.

Because the IC chip 21 is sealed in a resin so as to be configured into a molded IC, handling is facilitated and superior water resistance can be achieved.

Moreover, in Embodiment 1 above, the voltage regulator 20, the surge absorber 25, and the connector 29 are disposed radially outside the slinger 17 on a first circumferential side of the brush holder 18 so as to line up in a single column in a radial direction, but sequential order of the voltage regulator 20, the surge absorber 25, and the connector 29 is not limited to being in order of the voltage regulator 20, the surge absorber 25, and the connector 29 from the slinger 17, and may also be arranged in order of the surge absorber 25, the voltage regulator 20, and the connector 29 from the slinger 17.

In Embodiment 1 above, the voltage regulator 20 and the surge absorber 25 are housed in the resin body 31 from the first axial end of the slinger 17, but the voltage regulator 20 and the surge absorber 25 may also be housed in the resin body 31 from the second axial end of the slinger 17.

Embodiment 2

Figure 5:
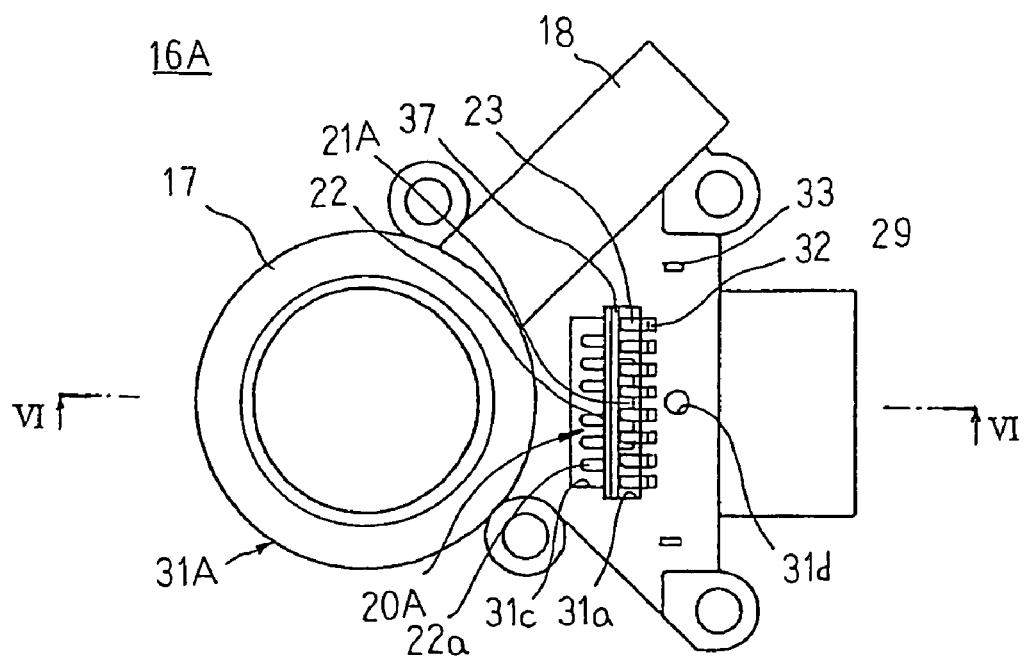
FIG. 5 is a plan explaining a configuration of an automotive alternator voltage control apparatus according to Embodiment 2 of the present invention (Embodiment 2)
Figure 6:
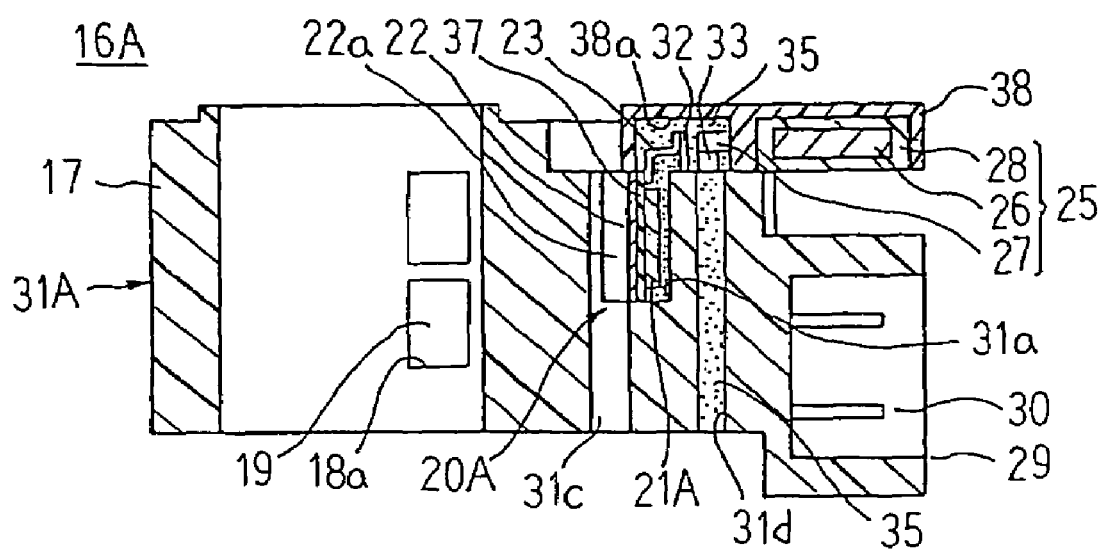
FIG. 6 is a cross section taken along line VI-VI in FIG. 5 viewed from the direction of the arrows (Embodiment 2)
Figure 7:
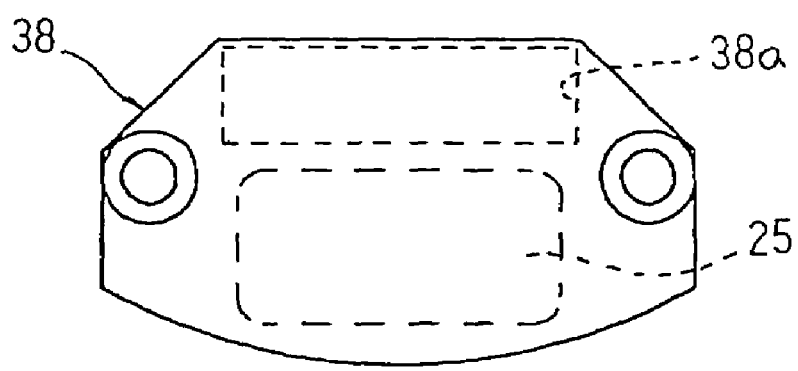
FIG. 7 is a plan showing a surge absorber used in the automotive alternator voltage control apparatus according to Embodiment 2 of the present invention (Embodiment 2)

FIG. 5 is a plan explaining a configuration of an automotive alternator voltage control apparatus according to Embodiment 2 of the present invention, FIG. 6 is a cross section taken along line VI-VI in FIG. 5 viewed from the direction of the arrows, and FIG. 7 is a plan showing a surge absorber used in the automotive alternator voltage control apparatus according to Embodiment 2 of the present invention. Moreover, FIG. 5 shows the voltage control apparatus before mounting of the surge absorber.

In FIGS. 5 through 7, a voltage control apparatus 16A includes: a ring-shaped slinger 17 through which a shaft 5 is inserted; a brush holder 18 that is disposed so as to extend radially from an outer peripheral wall surface of the slinger 17 and that is formed such that a brush insertion aperture 18a having an aperture direction in a radial direction is open at an inner peripheral wall surface of the slinger 17; positive electrode and the negative electrode brushes 19 that are disposed inside the brush insertion aperture 18a of the brush holder 18 so as to line up in an axial direction of the slinger 17 and be movable radially; a voltage regulator 20A that is disposed radially outside the slinger 17 on a first circumferential side of the brush holder 18 and adjusts a magnitude of the alternating voltage originating in the stator 9; a connector 29 that is disposed radially outside the voltage regulator 20A so as to input from outside a field current that is supplied to a rotor coil 12 through brushes 19 and slip rings 10 and externally output the direct current that has been rectified by a rectifier 11; and a surge absorber 25 that is disposed at a first axial end (a rear end) of the voltage regulator 20A and the connector 29 so as to absorb surges arising due to voltage adjustment by the voltage regulator 20A and prevent propagation of noise to vehicle electrical load devices such as audio equipment, etc.

The voltage regulator 20A includes: an IC chip 21A on which is formed a circuit required for automotive alternator output voltage control; a ceramic circuit board 37 to which electronic components (not shown) such as power transistors, diodes, etc., and the IC chip 21A are mounted so as to be electrically connected to a wiring pattern (not shown) formed on a front surface; a heat sink 22 to which the ceramic circuit board 37 is bonded; and external connecting terminals 23 that are electrically connected to the wiring pattern of the ceramic circuit board 37. Here, by being mounted to the ceramic circuit board 37 together with the electronic components such as power transistors, diodes, etc., the IC chip 21A is configured into a hybrid IC. This hybrid IC is formed so as to have a flat external shape, and all of the external connecting terminals 23 project outward from a single side surface of the ceramic circuit board 37. The surge absorber 25 includes: a capacitor element 26 having a pair of terminals 27; and a resin portion 28 in which the capacitor element 26 is sealed in an epoxy resin, for example, such that portions of the terminals 27 are exposed.

The slinger 17, the brush holder 18, and the connector 29 are molded integrally using an insulating resin such as a polyphenylene sulfide (PPS) resin, etc., for example, so as to be configured into a generally fan-shaped resin body 31A centered around the slinger 17.

In the resin body 31A, an IC housing aperture 31a having a rectangular cross section is formed between the slinger 17 and the connector 29 so as to have a short-side direction of the rectangular cross section aligned radially, and so as to be open at a first axial end of the slinger 17 (a rear end). A penetrating aperture 31c is formed so as to pass through the resin body 31A in an axial direction of the slinger 17 between the slinger 17 and the IC housing aperture 31a. In addition, a resin injection penetrating aperture 31d is formed so as to pass through the resin body 31A in the axial direction of the slinger 17 between the IC housing aperture 31a and the connector 29.

A terminal assembly (not shown) constituted by insert conductors 36 is insert molded into the resin body 31A. Portions of four insert conductors 36 project into the connector 29 so as to constitute input and output terminals 30 that can be electrically connected to an external device (not shown). Portions of eight insert conductors 36 are exposed in a vicinity of an opening of the IC housing aperture 31a of the resin body 31A so as to constitute voltage regulator connecting terminals 32. In addition, portions of two insert conductors 36 are exposed at a predetermined position on the resin body 31A so as to constitute surge absorber connecting terminals 33.

A holding plate 38 is molded using an insulating resin such as a polyphenylene sulfide (PPS) resin, etc., for example, into a flat plate having an external shape that covers the IC housing aperture 31a and the connector 29. A resin pool 38a is recessed into a first surface of the holding plate 38 so as to cover surge absorber connecting terminals 33 constituted by the portions of the insert conductors 36 projecting from the IC housing aperture 31a, the resin injection penetrating aperture 31d; and the resin body 31A. Moreover, the portion of the holding plate 38 on which the resin pool 38a is formed constitutes a cover. In addition, the surge absorber 25 is molded into the holding plate 38 such that the terminals 27 project into the resin pool 38a. Moreover, the surge absorber 25 is positioned at a first axial end of the connector 29 during mounting to the resin body 31A.

The hybrid IC that is formed by mounting the IC chip 21A and electronic components onto the ceramic circuit board 37 is housed inside the IC housing aperture 31a such that the external connecting terminals 23 project outward. These external connecting terminals 23 are joined by welding, etc., to the voltage regulator connecting terminals 32 that are constituted by portions of the insert conductors 36 projecting from the resin body 31A. Here, radiating fins 22a of the heat sink 22 project inside the penetrating aperture 31c.

The holding plate 38 that is formed by molding the surge absorber 25 is disposed such that the surge absorber connecting terminals 33 constituted by the IC housing aperture 31a, the resin injection penetrating aperture 31d, and the portions of the insert conductors 36 projecting from the resin body 31A are housed inside the resin pool 38a. These terminals 27 are joined by welding, etc., to the surge absorber connecting terminals 33.

In addition, a silicone resin 35 is injected from a second axial end of the slinger 17 through the resin injection penetrating aperture 31d into the resin pool 38a. Thus, the resin pool 38a and the IC housing aperture 31a are filled with the silicone resin 35, embedding the IC chip 21A, the external connecting terminals 23, the terminals 27, the voltage regulator connecting terminals 32, the surge absorber connecting terminals 33, and terminal joint portions inside the silicone resin 35.

A voltage control apparatus 16A configured in this manner is mounted in a similar manner to Embodiment 1 above by inserting the second end portion of the shaft 5 through the slinger 17 and fastening the resin body 31A to the rear bracket 3. The voltage control apparatus 16A is thereby disposed in a general fan shape centered around the slinger 17 in a plane perpendicular to a central axis of the shaft 5. The brushes 19 are pressed onto the slip rings 10 by forces from springs (not shown) that are disposed in a compressed state inside the brush insertion apertures 18a of the brush holder 18, and slide in contact with the outer peripheral surfaces of the slip rings 10 with the rotation of the shaft 5, ensuring electrical connection.

The rectifier 11 is formed so as to have a planar shape that is a general C shape when viewed from an axial direction of the shaft 5, and is disposed in a region where the voltage control apparatus 16A is not installed (a C-shaped region) in a plane perpendicular to the central axis of the shaft 5.

In Embodiment 2, the voltage control apparatus 16A is configured such that the brush holder 18 is disposed so as to extend radially from the outer peripheral wall surface of the slinger 17, and the voltage regulator 20A and the connector 29 are disposed radially outside the slinger 17 so as to line up in a single column in a radial direction on a first circumferential side of the brush holder 18. In addition, the surge absorber 25 is disposed so as to overlap with the first axial end of the connector 29. Thus, the angle formed by first and second end surfaces of the general fan shape centered around the slinger 17 is narrower, enabling a compact voltage control apparatus 16A having a small circumferential size to be achieved. Thus, when this voltage control apparatus 16A is mounted to an automotive alternator, because the region occupied by the rectifier 11 in the plane perpendicular to the axial direction of the slinger 17 can be widened, enabling the area of the heat sink of the rectifier 11 to be increased, cooling efficiency of the heat sink is improved, enabling temperature increases in the diodes of the rectifier 11 to be suppressed.

Because the IC housing aperture 31a that houses the voltage regulator 20A is formed so as to have rectangular cross sections that have short sides aligned radially and the surge absorber 25 is disposed so as to overlap with the first axial end of the connector 29, radial length of the voltage regulator 20A and the connector 29 arranged in a single column is even shorter, and the connector 29 will not project beyond the rear bracket 3.

Because the connection portions between the external connecting terminals 23 of the voltage regulator 20A and the voltage regulator connecting terminals 32 and the connection portions between the terminals 27 of the surge absorber 25 and the surge absorber connecting terminals 33 are configured at the first axial end of the slinger 17, workability when joining the terminals to each other is improved. In addition, because the connection portions between the external connecting terminals 23 of the voltage regulator 20A and the voltage regulator connecting terminals 32 and the connection portions between the terminals 27 of the surge absorber 25 and the surge absorber connecting terminals 33 are embedded in the silicone resin 35, insulation and water proofing are improved.

Because the IC housing aperture 31a is sealed over by the holding plate 38, the IC housing aperture 31a is filled without the silicone resin 35 leaking out.

Because the IC chip 21A is mounted to the ceramic circuit board 37 together with the electronic components so as to be configured into a hybrid IC, radial width of the IC housing aperture 31a can be made narrower and radial length can be reduced, enabling the voltage control apparatus 16A to be made more compact.

Embodiment 3

Figure 8:
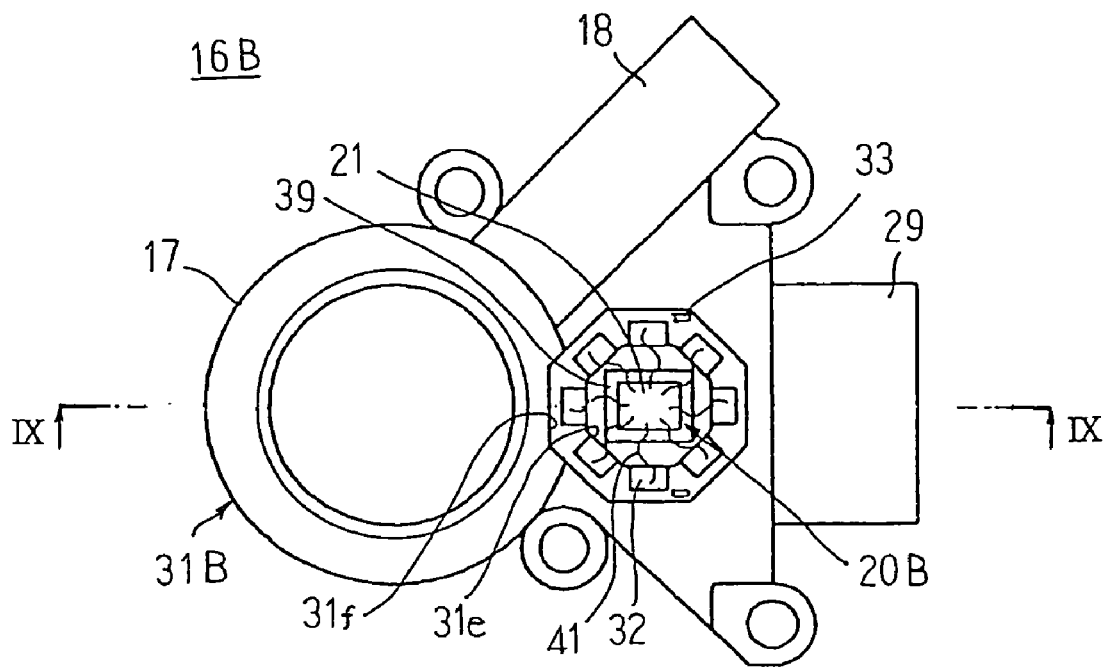
FIG. 8 is a plan explaining a configuration of an automotive alternator voltage control apparatus according to Embodiment 3 of the present invention (Embodiment 3)
Figure 9:
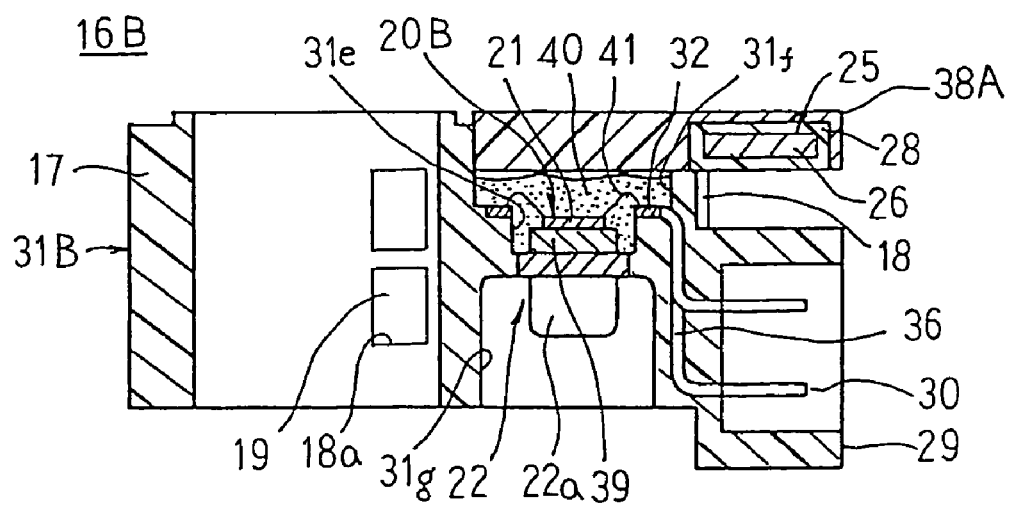
FIG. 9 is a cross section taken along line IX-IX in FIG. 8 viewed from the direction of the arrows (Embodiment 3)
Figure 10:
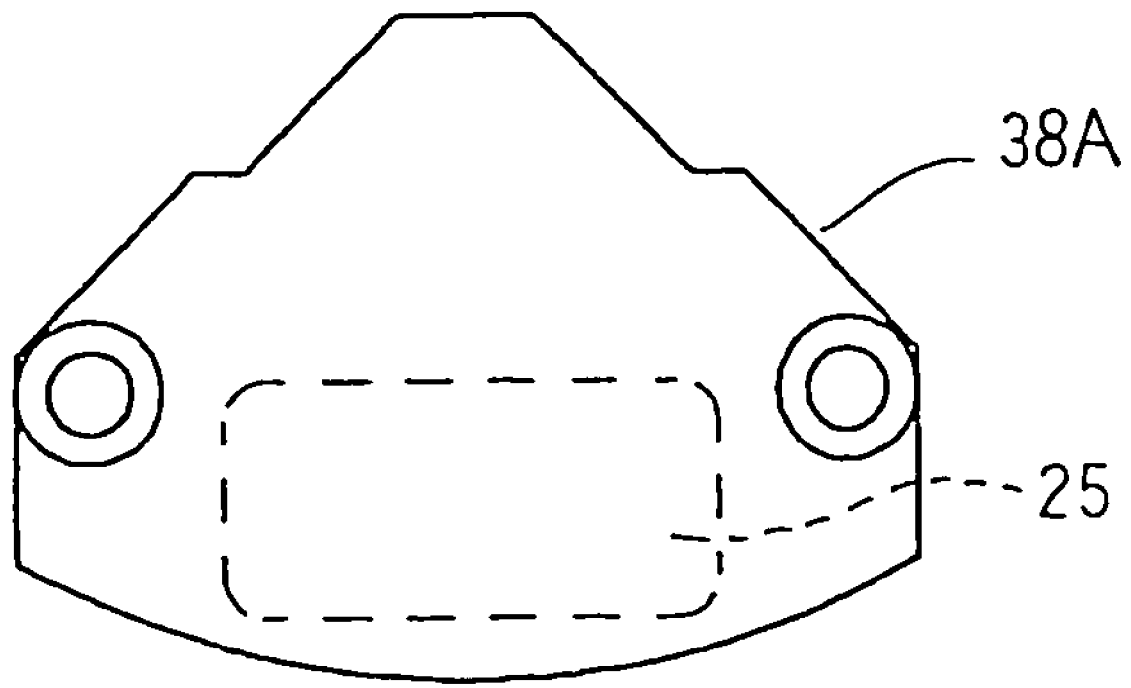
FIG. 10 is a plan showing a surge absorber used in the automotive alternator voltage control apparatus according to Embodiment 3 of the present invention (Embodiment 3).

FIG. 8 is a plan explaining a configuration of an automotive alternator voltage control apparatus according to Embodiment 3 of the present invention, FIG. 9 is a cross section taken along line IX-IX in FIG. 8 viewed from the direction of the arrows, and FIG. 10 is a plan showing a surge absorber used in the automotive alternator voltage control apparatus according to Embodiment 3 of the present invention. Moreover, FIG. 8 shows the voltage control apparatus before mounting of the surge absorber.

In FIGS. 8 through 10, a voltage control apparatus 16B includes: a ring-shaped slinger 17 through which a shaft 5 is inserted; a brush holder 18 that is disposed so as to extend radially from an outer peripheral wall surface of the slinger 17 and that is formed such that a brush insertion aperture 18a having an aperture direction in a radial direction is open at an inner peripheral wall surface of the slinger 17; positive electrode and the negative electrode brushes 19 that are disposed inside the brush insertion aperture 18a of the brush holder 18 so as to line up in an axial direction of the slinger 17 and be movable radially; a voltage regulator 20B that is disposed radially outside the slinger 17 on a first circumferential side of the brush holder 18 and adjusts a magnitude of the alternating voltage originating in the stator 9; a connector 29 that is disposed radially outside the voltage regulator 20B so as to input from outside a field current that is supplied to a rotor coil 12 through brushes 19 and slip rings 10 and externally output the direct current that has been rectified by a rectifier 11; and a surge absorber 25 that is disposed at a first axial end (a rear end) of the voltage regulator 20B and the connector 29 so as to absorb surges arising due to voltage adjustment by the voltage regulator 20B and prevent propagation of noise to vehicle electrical load devices such as audio equipment, etc.

The voltage regulator 20B includes: an integrated circuit (IC) chip 21 on which is formed a circuit required for automotive alternator output voltage control; a flat copper heat sink 39 to which the IC chip 21 is soldered; and a heat sink 22 to which the heat sink 39 is bonded. Here, by being soldered directly to the heat sink 39, the IC chip 21 is configured into a single-chip IC. The surge absorber 25 includes: a capacitor element 26 having a pair of terminals 27; and a resin portion 28 in which the capacitor element 26 is sealed in an epoxy resin, for example, such that portions of the terminals 27 are exposed.

The slinger 17, the brush holder 18, and the connector 29 are molded integrally using an insulating resin such as a polyphenylene sulfide (PPS) resin, etc., for example, so as to be configured into a fan-shaped resin body 31B centered around the slinger 17.

In the resin body 31B, an IC housing aperture 31e having an octagonal cross section functioning as a voltage regulator housing aperture is formed between the slinger 17 and the connector 29 so as to be open at a first axial end of the slinger 17 (a rear end), and a resin pool aperture 31f is formed so as to surround the IC housing aperture 31e. The resin pool aperture 31f is formed so as to be shallower than the IC housing aperture 31e, and together with the IC housing aperture 31e constitutes a stepped aperture. A heat sink housing aperture 31g is formed in the resin body 31B opposite the IC housing aperture 31e so as to be open at a second axial end (a front end) of the slinger 17. The heat sink 22 is insert molded integrally into the resin body 31B such that a major surface is exposed inside the IC housing aperture 31e and radiating fins 22a project inside the heat sink housing aperture 31g.

A terminal assembly (not shown) constituted by insert conductors 36 is insert molded into the resin body 31B. Portions of four insert conductors 36 project into the connector 29 so as to constitute input and output terminals 30 that can be electrically connected to an external device (not shown). Portions of eight insert conductors 36 are exposed in a vicinity of an opening of the IC housing aperture 31a of the resin pool aperture 31f so as to constitute voltage regulator connecting terminals 32. In addition, portions of two insert conductors 36 are exposed at a predetermined position on the resin pool aperture 31f so as to constitute surge absorber connecting terminals 33.

A holding plate 38A is molded using an insulating resin such as a polyphenylene sulfide (PPS) resin, etc., for example, into a flat plate having an external shape that covers the IC housing aperture 31a, the resin pool aperture 31f, and the connector 29. The surge absorber 25 is molded into the holding plate 38A such that the terminals 27 (not shown) project outward on a back surface. Moreover, the surge absorber 25 is positioned at a first axial end of the connector 29 during mounting to the resin body 31B, and the terminals 27 project inside the resin pool aperture 31f.

The heat sink 39 to which the IC chip 21 has been soldered is bonded to the major surface of the heat sink 22 and housed inside the IC housing aperture 31e. Electrode pads (not shown) of the IC chip 21 are connected by wire bonding to the voltage regulator connecting terminals 32 constituted by portions of the insert conductors 36 projecting from the resin body 31B into the resin pool aperture 31f.

The holding plate 38A that is formed by molding the surge absorber 25 is disposed so as to cover the IC housing aperture 31e and the resin pool aperture 31f. The terminals 27 are joined by welding, etc., to the surge absorber connecting terminals 33 constituted by portions of the insert conductors 36 projecting from the resin body 31B into the resin pool aperture 31f.

In addition, a silicone gel 40 is injected into the IC housing aperture 31e and the resin pool aperture 31f. Thus, the IC housing aperture 31e and the resin pool aperture 31f are filled with the silicone gel 40, embedding the IC chip 21, bonding wires 41, the terminals 27, the voltage regulator connecting terminals 32, the surge absorber connecting terminals 33, and terminal joint portions inside the silicone gel 40.

A voltage control apparatus 16B configured in this manner is mounted in a similar manner to Embodiment 1 above by inserting the second end portion of the shaft 5 through the slinger 17 and fastening the resin body 31B to the rear bracket 3. The voltage control apparatus 16B is thereby disposed in a general fan shape centered around the slinger 17 in a plane perpendicular to a central axis of the shaft 5. The brushes 19 are pressed onto the slip rings 10 by forces from springs (not shown) that are disposed in a compressed state inside the brush insertion apertures 18a of the brush holder 18, and slide in contact with the outer peripheral surfaces of the slip rings 10 with the rotation of the shaft 5, ensuring electrical connection.

The rectifier 11 is formed so as to have a planar shape that is a general C shape when viewed from an axial direction of the shaft 5, and is disposed in a region where the voltage control apparatus 16B is not installed (a C-shaped region) in a plane perpendicular to the central axis of the shaft 5.

In Embodiment 3, the voltage control apparatus 16B is configured such that the brush holder 18 is disposed so as to extend radially from the outer peripheral wall surface of the slinger 17, and the voltage regulator 20B and the connector 29 are disposed radially outside the slinger 17 so as to line up in a single column in a radial direction on a first circumferential side of the brush holder 18. In addition, the surge absorber 25 is disposed so as to overlap with the first axial end of the connector 29. Thus, the angle formed by first and second circumferential end surfaces of the general fan shape centered around the slinger 17 is narrower, enabling a compact voltage control apparatus 16B having a small circumferential size to be achieved. Thus, when this voltage control apparatus 4-616B is mounted to an automotive alternator, because the region occupied by the rectifier 11 in the plane perpendicular to the axial direction of the slinger 17 can be widened, enabling the area of the heat sink of the rectifier 11 to be increased, cooling efficiency of the heat sink is improved, enabling temperature increases in the diodes of the rectifier 11 to be suppressed.

Because the connection portions between the electrode pads of the IC chip 21 of the voltage regulator 20B and the voltage regulator connecting terminals 32 and the connection portions between the terminals 27 of the surge absorber 25 and the surge absorber connecting terminals 33 are configured at the first axial end of the slinger 17, workability when joining the terminals to each other is improved. In addition, because the connection portions between electrode pads of the IC chip 21 of the voltage regulator 20B and the voltage regulator connecting terminals 32 and the connection portions between the terminals 27 of the surge absorber 25 and the surge absorber connecting terminals 33 are embedded in the silicone gel 40, insulation and water proofing are improved.

Because the IC chip 21 is mounted to the ceramic circuit board 37 together with the electronic components so as to be configured into a single-chip IC, the IC chip 21 is mounted by soldering to the heat sink 39 and housed inside the IC housing aperture 31e, and the silicone gel 40 is injected inside the IC housing aperture 31e and the resin pool aperture 31f, ensuring insulation, water proofing, and corrosion resistance. Thus, a resin tub 34 or cover for preventing leakage of the silicone-resin 35 as in Embodiments 1 and 2 above is no longer necessary.

Moreover, in each of the above embodiments, the voltage control apparatus is explained as being fixed by fastening to an inner peripheral surface of the rear bracket, but a voltage control apparatus may also be fixed by fastening to an outer peripheral surface of a rear bracket. In that case, a second end portion of a shaft is extended outward beyond a bearing, and slip rings are fixed to the second end portion of the shaft. The voltage control apparatus is mounted by inserting the second end portion of the shaft inside a slinger, and fastening a resin body to an outer wall surface of the rear bracket. A rectifier is also disposed in a region not occupied by the voltage control apparatus in a plane perpendicular to a central axis of the shaft, and is fixed by fastening to an outer wall surface of the rear bracket. In addition, a bowl-shaped resin cover is disposed so as to cover the voltage control apparatus and the rectifier, and is fixed by fastening to an outer peripheral surface of the rear bracket.

In Embodiments 2 and 3 above, the surge absorber 25 is disposed so as to overlap with the first axial end of the connector 29, but the surge absorber 25 may also be disposed so as to overlap with a first axial end of the voltage regulator 20A or 20B.

INDUSTRIAL APPLICABILITY

As explained above, because a voltage control apparatus according to the present invention enables an angle formed by first and second circumferential end surfaces of a general fan shape centered around a slinger to be reduced, when mounted to an automotive alternator, a region occupied by a rectifier installed together with the voltage control apparatus in a plane perpendicular to a central axis of a shaft can be widened, enabling area of a heat sink of the rectifier to be increased, thereby enabling cooling efficiency by the heat sink to be increased. Thus, the voltage control apparatus according to the present invention is particularly useful in automotive alternators for suppressing temperature increases in diodes of the rectifier.

What is claimed is:

1. An automotive alternator voltage control apparatus comprising:
an annular slinger;
a brush holder which extends radially from an outer peripheral wall surface of the slinger comprising:
a brush insertion aperture open at an inner peripheral wall surface of the slinger, and
first and second circumferential surfaces;
positive and negative electrode brushes inserted into the brush insertion aperture to line up in an axial direction of the slinger and be movable in a radial direction of the slinger;
a voltage regulator disposed proximate to and extending radially from the slinger and comprising:
an integrated circuit (IC) which comprises a circuit to control an automotive alternator output voltage;
a surge absorber disposed proximate to and extending radially from the voltage regulator that absorbs surges arising due to the output voltage control by the voltage regulator; and
a connector disposed proximate to and extending radially from the surge absorber to provide an input and an output from and to an external device,
wherein the voltage regulator, surge absorber and connector are aligned proximate the first circumferential surface of the brush holder and distal the second circumferential surface of the brush holder.

2. The automotive alternator voltage control apparatus according to claim 1, further comprising:
   a voltage regulator housing aperture to house the voltage regulator; and
   a surge absorber housing aperture to house the surge absorber, wherein the voltage regulator housing aperture and the surge absorber housing aperture are formed in said radial direction in a portion of a resin body between said slinger and said connector to align with one another so that said voltage regulator, said surge absorber and said connector are lined up in a single column in said radial direction.

3. The automotive alternator voltage control apparatus according to claim 2, wherein:
   said voltage regulator housing aperture and said surge absorber housing aperture are formed in said resin body to be open at a first axial end of the slinger; and wherein said voltage regulator and said surge absorber are inserted in said voltage regulator housing aperture and said surge absorber housing aperture from said first axial end.

4. The automotive alternator voltage control apparatus according to claim 3, wherein the IC circuit includes connecting terminals exposed outside of the voltage regulator and wherein the surge absorber includes connecting terminals exposed outside of the surge absorber, and further comprising:
   a plurality of insert conductors which are insert molded into said resin body to be exposed at said first axial end and including:
      a voltage regulator connecting terminal to connect to the exposed IC circuit connecting terminals at the first axial end, and
      a surge absorber connecting terminal to connect to said exposed surge absorber connecting terminals at said first axial end.

5. The automotive alternator voltage control apparatus according to claim 4, further comprising:
   a resin tub disposed on said resin body to surround said voltage regulator housing aperture, said surge absorber housing aperture, said voltage regulator connecting terminal, and said surge absorber connecting terminal; wherein said resin tub is filled with an insulating resin to embed a connection portion between said voltage regulator and said voltage regulator connecting terminal and a connection portion between said surge absorber and said surge absorber connecting terminal.

6. The automotive alternator voltage control apparatus according to claim 1, wherein:
   said IC comprises a molded IC comprising the IC chip sealed in a resin.

7. The automotive alternator voltage control apparatus according to claim 1, wherein:
   said IC comprises a hybrid IC comprising the IC chip mounted to an insulating circuit board.

8. An automotive alternator voltage control apparatus comprising:
   an annular slinger;
   a brush holder which extends radially from an outer peripheral wall surface of the slinger comprising:
      a brush insertion aperture open at an inner peripheral wall surface of the slinger, and
      first and second circumferential surfaces;
   positive and negative electrode brushes inserted into the brush insertion aperture to line up in an axial direction of the slinger and be movable in a radial direction of the slinger;
   a voltage regulator disposed proximate to and extending radially from the slinger and comprising:
      an integrated circuit (IC) which comprises a circuit to control an automotive alternator output voltage;
   a connector disposed proximate to and extending radially from the voltage regulator to provide an input and an output from and to an external device, and
   a surge absorber disposed at a first axial end of the voltage regulator and the connector and proximate to the voltage regulator and the connector which surge absorber absorbs surge arising due to the output voltage controlled by the voltage regulator;
   wherein the voltage regulator, surge absorber and connector are aligned proximate the first circumferential surface of the brush holder and distal the second circumferential surface of the brush holder.

9. The automotive alternator voltage control apparatus according to claim 8, further comprising:
   a voltage regulator housing aperture formed in a portion of a resin body between said slinger and said connector to house said voltage regulator so that said voltage regulator and said connector are lined up in a single column in a radial direction; wherein said surge absorber is disposed to overlap at the first axial end of the connector with said voltage regulator and said connector.

10. The automotive alternator voltage control apparatus according to claim 9, wherein said voltage regulator housing aperture is formed on said resin body to be open at a first axial end of the slinger, and wherein the IC circuit includes connecting terminals exposed outside of the voltage regulator and wherein the surge absorber includes connecting terminals exposed outside of the surge absorber, and further comprising:
   a plurality of insert conductors which are insert molded into said resin body to be exposed at said first axial end of the slinger and including:
      a voltage regulator connecting terminal to connect to the exposed IC circuit connecting terminals at the first axial end of the slinger, and
      a surge absorber connecting terminal to connect to said exposed surge absorber connecting terminals at said first axial end of the slinger.

11. The automotive alternator voltage control apparatus according to claim 10, further comprising:
   a cover disposed on said resin body to envelop said voltage regulator housing aperture, said voltage regulator connecting terminal, and said surge absorber connecting terminal; and
   a resin injection penetrating aperture disposed through said resin body to communicate between a second axial end of the slinger and an internal portion of said cover; wherein said cover is filled with an insulating resin through said resin injection penetrating aperture to embed a connection portion between said voltage regulator and said voltage regulator connecting terminal and a connection portion between said surge absorber and said surge absorber connecting terminal.

12. The automotive alternator voltage control apparatus according to claim 9, wherein:
   said voltage regulator housing aperture is formed to be open at a first axial end of the slinger;
   said IC comprises a single-chip IC comprising the IC chip joined directly to an exposed surface of a heat sink that is disposed inside said voltage regulator housing aperture; and further comprising:

a plurality of insert conductors which are insert molded into said resin body to be exposed around an outer periphery of said voltage regulator housing aperture and includes:
  a voltage regulator connecting terminal to which said IC chip is connected with a bonding wire; and
  a surge absorber connecting terminal to which said surge absorber is connected; and
an insulating resin gel material to embed said IC chip, said voltage regulator connecting terminal, said surge absorber connecting terminal, said bonding wire, a connection portion between said bonding wire and said voltage regulator connecting terminal, a connection portion between said bonding wire and said IC chip, and a connection portion between said surge absorber and said surge absorber connecting terminal.

* * * * *